April 8, 1952     J. E. NICHOLSON     2,591,855
CHEWING GUM DISPENSER
Filed April 12, 1950
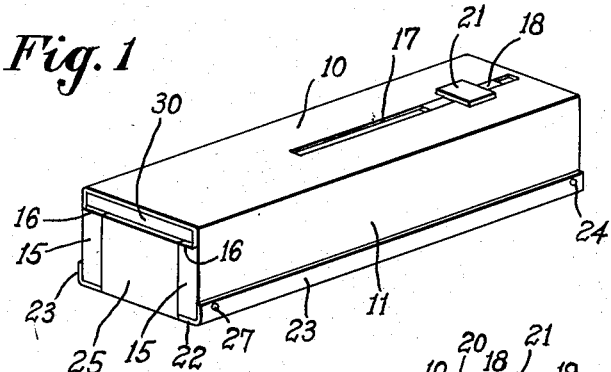
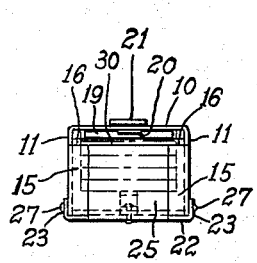
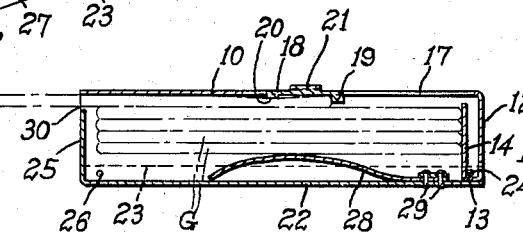
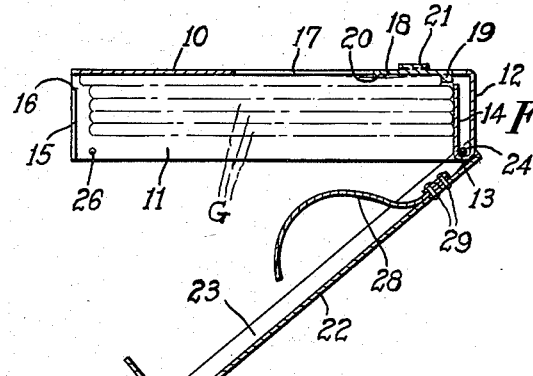
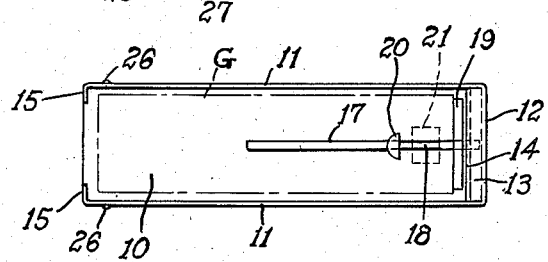
INVENTOR.
Jerry E. Nicholson
BY Frease and Bishop
ATTORNEYS Patented Apr. 8, 1952

2,591,855

UNITED STATES PATENT OFFICE 2,591,855

CHEWING GUM DISPENSER

Jerry E. Nicholson, Canton, Ohio

Application April 12, 1950, Serial No. 155,500

1 Claim. (Cl. 206—40)

The invention relates to a holder for containing a plurality of sticks or cakes of chewing gum and the like, having manually operated means for dispensing the sticks of gum one at a time from the holder.

It is an object of the invention to provide a device of the character referred to adapted to contain the usual package of five sticks or cakes of chewing gum and provided with easily operated means for projecting the sticks of gum one at a time therefrom.

Another object is to provide a holder and dispenser of this character comprising a container having a top wall, side walls and a rear end wall, and a bottom lid or cover hingedly connected at its rear end to the rear lower corner of the container and having an integral front wall at its forward end, of such height that when the lid or cover is in closed position a slot will be defined between the upper edge of said front wall and the top wall of the container, through which slot one stick or cake of gum may be projected at a time.

A further object is to provide such a device in which a curved leaf spring is connected at one end to the inner or upper side of the hinged bottom lid or cover and adapted to engage the sticks or cakes of gum in the container and press them upward in sucession against the underside of the top wall of the container.

A still further object is to provide such a device in which the rear end wall of the container has an integral upright false wall spaced therefrom, against which the rear ends of the sticks or cakes of gum are adapted to contact.

Another object of the invention is to provide a holder and dispenser of this character in which the top wall of the holder is provided with an elongated, longitudinal slot through which is slidably located a finger piece adapted to be slidably moved to a point beyond said false wall to engage the rear end of the uppermost stick or cake of gum and project it forwardly through the slot in the forward end of the container.

The above objects together with others which will be apparent from the drawing and following description, or which may be later referred to, may be attained by constructing the improved holder and dispenser in the manner hereinafter described in detail and illustrated in the accompanying drawing, in which;

Figure 1 is a perspective view of a holder and dispenser for chewing gum, constructed in accordance with the invention;

Fig. 2 a vertical, longitudinal, sectional view through the device showing the manner in which the uppermost stick or cake of chewing gum may be projected therefrom;

Fig. 3 a vertical, longitudinal, sectional view through the device showing the hinged bottom lid or cover in open position;

Fig. 4 a front end view of the device; and

Fig. 5 a bottom plan view of the container or holder with the hinged cover or lid removed.

The device may be formed of plastic material, sheet metal or other suitable material and the container comprises the top wall 10, the depending integral side walls 11, and the rear end wall 12. The rear end wall 12 has a forwardly projecting flange 13 formed at its lower end, and at the forward edge of this flange is an upstanding false wall 14, spaced inwardly from and parallel with the rear end wall 12 and terminating at its upper end at a point spaced below the underside of the top wall 10.

At the forward end of each side wall 11 is formed an inturned, relatively narrow flange 15, these flanges terminating at their upper ends at a point spaced below the underside of the top wall 10, as indicated at 16, the distance between the upper ends 16 of these flanges and the underside of the top wall 10 being slightly greater than the thickness of a stick or cake of gum.

An elongated, longitudinally disposed slot 17 is formed in the median line of the top wall 10 and extends from the rear end thereof to a point spaced from the forward end of said top wall. A slide 18 is mounted for longitudinal reciprocation within the slot 17 and has a transversely disposed, depending projection 19 at its rear end, for engagement with the rear end of the uppermost stick or cake of gum, as will be later explained.

A depending, transverse projection 20 may also be formed at the forward end of the slie 18, preferably of considerably less thickness than the projection 19. For the purpose of manually reciprocating the slide 18 within the slot 17, a knob or finger piece 21 is formed upon the upper side of the slide midway between the ends thereof.

The lower, open side of the container is adapted to be normally closed by the hinged lid or cover, indicated at 22, provided at its side edges with the upstanding, relatively narrow flanges 23 adapted to engage over the outer sides of the lower edge portions of the side walls 11 of the container, when the cover is in closed position, as best shown in Figs. 1 and 4.

This lid or cover is hingedly connected to the container as by a hinge pin 24 located through the lower, rear corner portions of the side walls 11, between the rear wall 12 and the false wall 14, as best shown in Figs. 2 and 3, and through the rear end portions of the flanges 23 of the lid or cover.

The front wall 25 is integrally formed at the forward end of the hinged lid or cover 22 and extends upwardly therefrom at a 90° angle. This front wall is adapted to be received between the flanges 15 at the forward end of the container, when the hinged lid or cover is in closed position, and is of such height that in this position it terminates in the same horizontal plane as the upper ends 16 of the flanges 15.

The hinged lid or cover may be normally held in closed position by means of flat projections 26 formed in the forward lower corner portions of the side walls 11 and similar indentations 27 formed in the forward ends of the flanges 23 of the hinged lid or cover, so that when the cover is in closed position the projections 26 will be frictionally received within the indentations 27.

For the purpose of pressing the sticks or cakes of chewing gum upward within the container, so that the uppermost stick of gum is always held against the underside of the top wall 10, a curved leaf spring 28 is provided, the rear end thereof being riveted, or otherwise rigidly attached, to the rear portion of the hinged lid or cover 22, as indicated at 29.

A plurality of sticks or cakes of gum, as indicated in broken lines at G in Figs. 2 and 3, may thus be located within the container and by means of the leaf spring 28 will be pressed upwardly so that the uppermost stick or cake of gum is held against the underside of the top wall 10 of the container.

When it is desired to dispense a stick of gum from the device, the slide 18 is manually moved backward in the slot 17 to the rear end of the slot, so that the depending projection 19 of the slide will pass beyond the false wall 14 and engage the rear end of the uppermost stick or cake of gum.

Then by moving the slide 18 forwardly in the slot, this uppermost stick or cake of gum is projected through the slot 30, at the forward end of the container, defined by the underside of the top wall 10 and the upper edges of the front wall 25 and flanges 15.

As this uppermost stick of gum is withdrawn from the container the spring 28 will press the remaining sticks of gum in the container upwardly so that the next uppermost stick of gum will be pressed upwardly against the underside of the top wall 10. By repeating the above described operation of the slide 18, each stick of gum in succession may be thus projected through the slot 30 in the forward end of the container.

When the container has been entirely emptied of gum it may be easily refilled by opening the hinged lid or cover 22, as shown in Fig. 3, and refilling the container with sticks or cakes of gum. The hinged lid or cover is then closed and the gum may again be dispensed from the container in the manner above described.

I claim:

A chewing gum holder and dispenser comprising a container having a top wall, depending side walls and rear end wall, opposed vertical flanges at the forward ends of the side walls, said flanges terminating at a point spaced below the top wall, a false wall integrally connected at its lower end to the lower end of the rear end wall, said false wall being spaced inwardly from and parallel with the rear end wall and terminating at its upper end at a point spaced below the top wall, a bottom cover for the container, means hinging the rear end of the cover to the rear lower corner of the container between the rear end wall and the false wall, a front end wall fixed upon the forward end of the cover and received between said vertical flanges, said front end wall terminating in the same horizontal plane as said vertical flanges so as with said flanges to define a slot between the upper ends of the front wall and flanges and the top wall, through which slot a stick of gum may be projected, spring means connected to the top of the cover for pressing a plurality of sticks of gum upward in the container against the top wall, between said false wall and said front end wall, and a manually operated slide mounted for longitudinal reciprocation upon the top wall and having a depending projection for passing rearwardly over the top of the false wall and engaging the rear end of the uppermost stick of gum and projecting it through said slot.

JERRY E. NICHOLSON.

REFERENCES CITED

The following references are of record in the file of this patent:

UNITED STATES PATENTS

| Number | Name | Date |
|---|---|---|
| 121,584 | Campbell | Dec. 5, 1871 |
| 943,553 | Jenner | Dec. 14, 1909 |
| 1,244,363 | Packard | Oct. 23, 1917 |
| 1,448,777 | Turner | Mar. 20, 1923 |
| 1,526,273 | Ferguson | Feb. 10, 1925 |
| 1,701,565 | Hammett | Feb. 12, 1929 |
| 1,734,644 | Ostrander et al. | Nov. 5, 1929 |